Dec. 8, 1931.  C. A. SMITH  1,835,346
DECOY APPARATUS FOR DOG RACES
Filed Oct. 15, 1926  3 Sheets-Sheet 1

INVENTOR.
CHARLES A. SMITH.
BY Ely & Barrow
ATTORNEY.

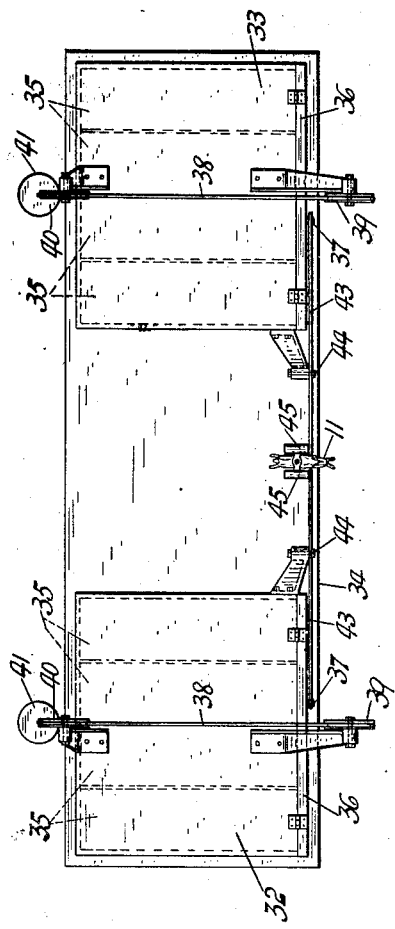

Dec. 8, 1931.                C. A. SMITH                1,835,346
                    DECOY APPARATUS FOR DOG RACES
                Filed Oct. 15, 1926     3 Sheets-Sheet 3
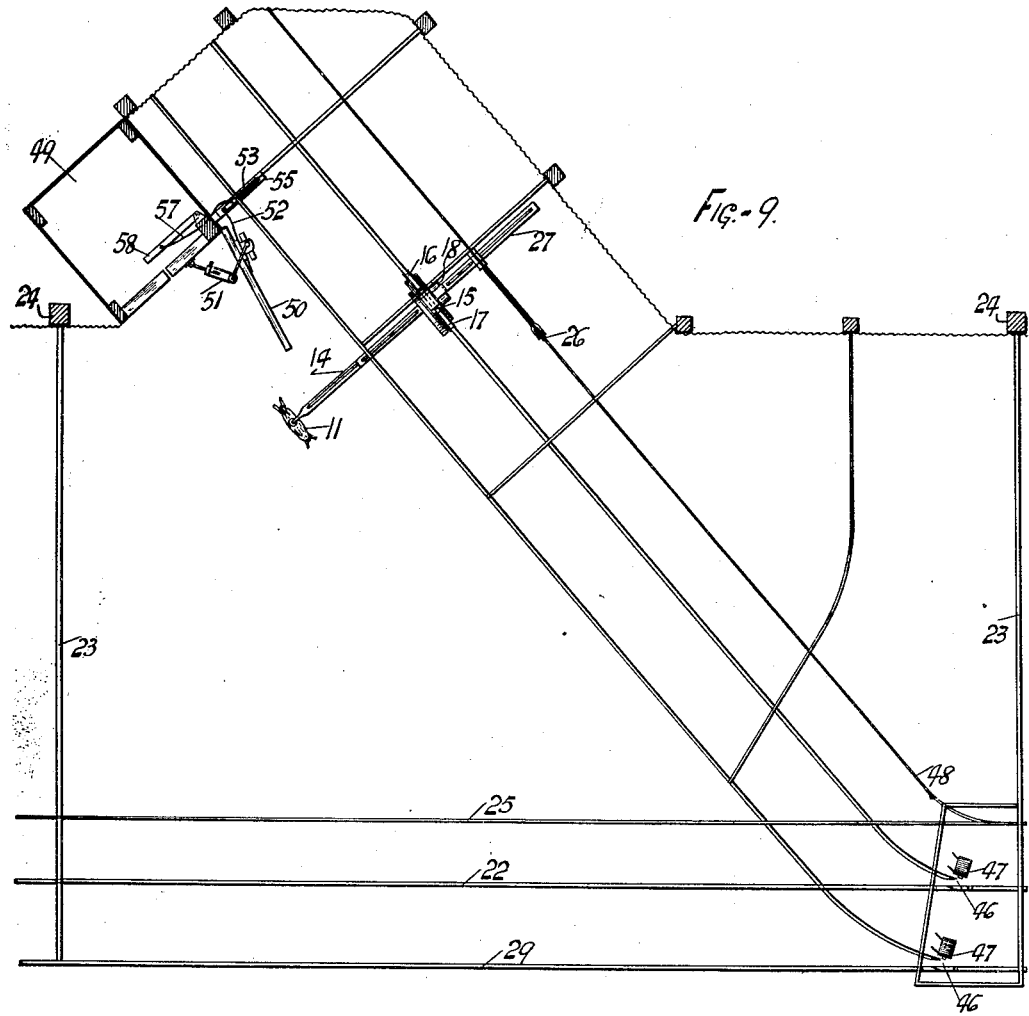
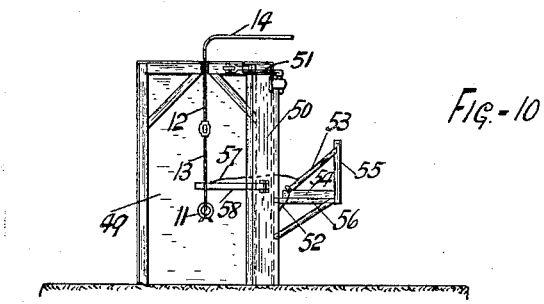
INVENTOR.
CHARLES A. SMITH.
BY
ATTORNEY.

Patented Dec. 8, 1931

1,835,346

UNITED STATES PATENT OFFICE

CHARLES A. SMITH, OF AKRON, OHIO

DECOY APPARATUS FOR DOG RACES

Application filed October 15, 1926. Serial No. 141,749.

This invention relates to decoy or lure apparatus for dog race tracks.

The general purpose of the invention is to provide an overhead system for operating a decoy or lure, such as a stuffed animal, about a dog race track.

One particular object of the invention is to provide, in combination with the decoy or lure, dog boxes adapted to be opened by operation of the decoy.

Another particular object of the invention is to provide, in combination with such a system, means for causing the lure or decoy to travel over hurdles in a manner to simulate jumping.

Another object of the invention is to provide in such a system means for switching the decoy carriage off the track.

Another object is to provide an escape for the decoy, comprising a box or trap into which the decoy may be run when switched off the track and having a trap door adapted to be closed by operation of the decoy into the trap.

The foregoing and other objects of the invention are obtained by the apparatus illustrated in the accompanying drawings and described below. It is to be understood that the invention is not limited to the particular form thereof shown and described.
Of the accompanying drawings, Figure 1 is a transverse section through one side of a dog track equipped with the overhead traveling decoy apparatus of the invention;
Figure 2 is an enlarged end elevation of the decoy carriage;

Figure 5 is a plan of the dog starting box equipment adapted for operation by the decoy;

Figure 6 is a front elevation thereof;

Figure 7 is a side elevation thereof;

Figure 8 is a detail of the cooperating devices connected to the decoy and the boxes for opening the latter;

Figure 9 is a diagrammatic plan of the switching devices and the escape;

Figure 10 is an elevation of the escape.

Figure 1:
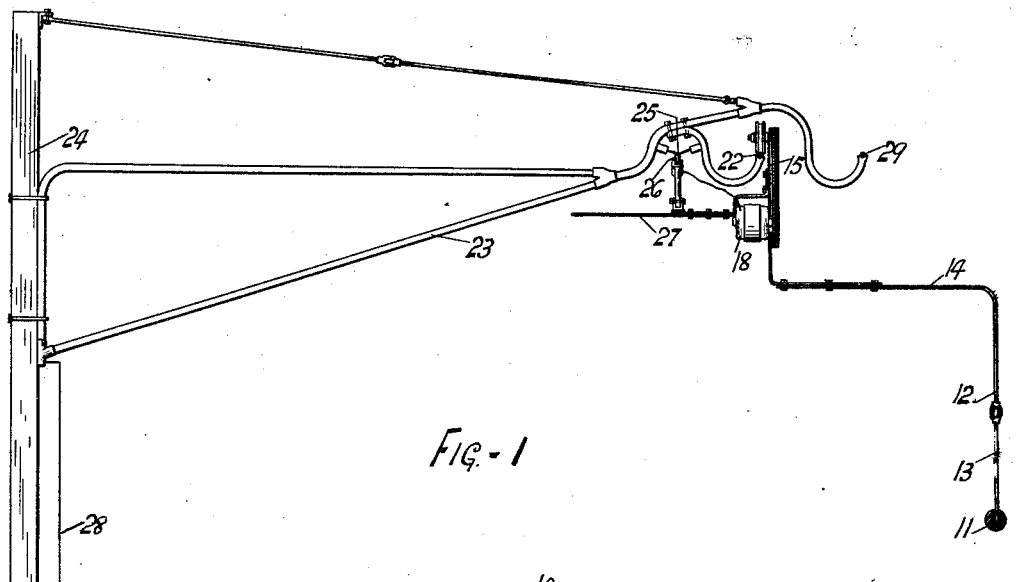
Figures 2, 3:
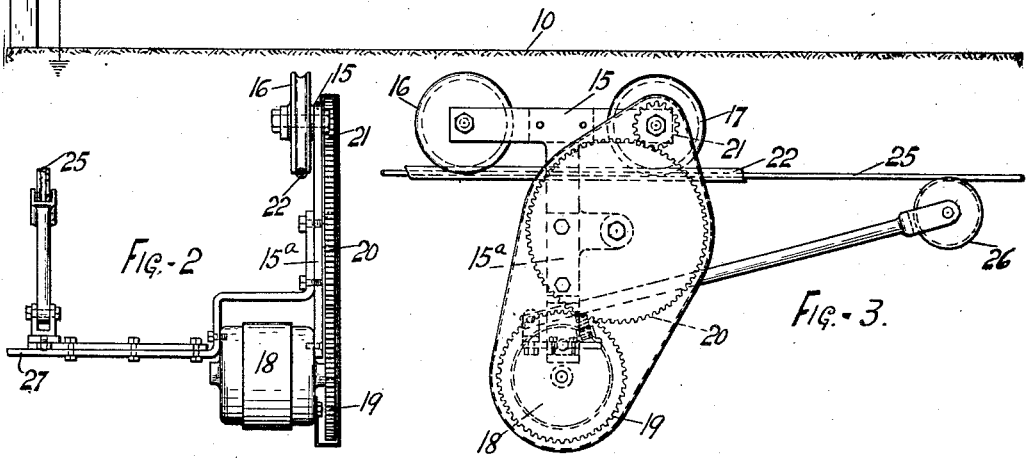
Figure 3 is a side elevation thereof.

Referring to the drawings, the numeral 10 indicates a dog track and the numeral 11 the decoy which is arranged to travel about the track, preferably in the center thereof. The decoy 11 is supported by a suitable bracket 12 having a vertically adjustable section 13 and a horizontally adjustable portion 14 for positioning the decoy 11 in the desired relation to the track, bracket 12 being secured to a carriage 15 so as to depend therefrom.

Carriage 15 comprises front and rear grooved wheels 16 and 17 journaled on the frame 15 and which has a depending portion 15$^a$ carrying a motor 18 adapted to drive wheel 17 through gears 19, 20 and 21.

Any suitable overhead track may be provided for carriage 15, a cable 22 being here shown mounted on brackets 23 secured on posts 24 arranged in spaced relation about the track 10. Power may be supplied motor 18 by means of a trolley wire 25 supported by brackets 23, the trolley 26 being swiveled on an arm 27 on carriage 15 and being electrically connected by a suitable lead to motor 18, the other lead of which is grounded through the carriage 15, cable 22, a bracket 23 and a grounded lead 28.

Figure 4:
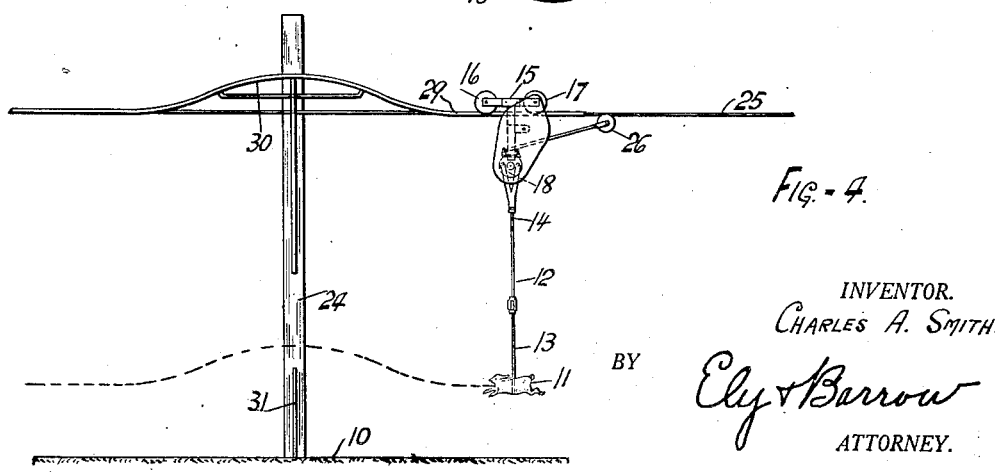
Figure 4 is a side elevation of a portion of the track illustrating the use of hurdles and the equipment for causing the decoy to pass thereover as if jumping.

To provide for effective use of the decoy for hurdle jumping races, a second cable track 29 may be employed, also carried by brackets 23 and being suitably supported to provide an elevated portion 30 over hurdles such as shown at 31 so as to cause the decoy 11 to clear the hurdle as if jumping (see Figure 4). Trolley 26 is arranged to be adjusted along arm 27 so that trolley wire 25 may be used to supply power to motor 18 on either cable track 22 or 29, the portion 14 of bracket 12 admitting of adjustment of the lure 11 to a position in the center of the track when carriage 15 is on either of tracks 22 or 29.

Referring to Figures 5 to 8, the dog box equipment arranged for operation by the foregoing system preferably comprises two boxes 32 and 33 adapted to be arranged on each side of the center of track 10 by being supported on a truck 34. Each box has several dog compartments 35, 35 and each has an end closure 36 normally held closed by a pin 37 but adapted to be swung open upon release of said pin by a cable 38 extending over sheaves 39 and 40 and having a weight 41 thereon. Pins 37 are each connected by a string 42 or the like to one end of a lever 43 pivoted at 44 on each box and each projecting from each box adjacent to bracket 12. The latter is provided with cam members 45, 45 thereon arranged to engage and depress levers 43 as the decoy passes between the boxes to start a race, this causing pins 37 to be withdrawn and permitting closures 36 to open, thus releasing the dogs.

In Figures 9 and 10 an escape is shown for the decoy for ending the race. Each of cables 22 or 29 are provided with switches 46, 46 pivoted thereto electromagnetically operable by suitable standard means indicated at 47, 47 operable to open the switches sufficiently to permit the carriage to clear the main tracks as it is switched therefrom. The trolley wire 25 is provided with the usual device for switching trolley 26 onto branch trolley 48.

Arranged to receive the decoy or lure 11 when switched off track 10 is a trap box 49 having a trap door 50 provided with a suitable yielding door-closing device 51, which door may be held open when the trap is set by means of a rope 52 connected to the door and to a bar 53 adapted to be wedged into place between two members 54 and 55 on a bracket 56 secured on the trap box. A rope 57 is connected to bar 53 and to an arm 58 pivoted in the trap box and adapted to be engaged by bracket 12 to pull bar 53 out of its wedged position and thus permit the trap door 50 to close.

In operation of the equipment for ordinary races, the dog boxes 32 are rolled into position in the center of the track. The decoy 11 is then started from behind the boxes and as it passes between the boxes, releases the dogs who race after the decoy about the track. The boxes are then removed and the race proceeds the desired number of laps. After the finish before the judges stand the decoy carriage is switched from the main cable 22 and the decoy is run into the trap 49 which automatically closes. An operative in a tower at the center of the area encircled by the track may operate the decoy and the switches by suitable circuits and rheostats (not shown).

When hurdle races are to be held, the hurdles 31 are placed on the track 10 beneath the elevations of track 29, the carriage 15 is lifted over onto track 29, the trolley arm 27 is adjusted to permit trolley 26 to ride on trolley wire 25 and the bracket portion 14 is adjusted to center the decoy on track 10. The race is then started and finished as described above, the carriage 15 carrying the decoy over the hurdles 31 as will be understood.

Modifications of the invention may be resorted to without departing from the spirit thereof or the scope of the appended claims.

What is claimed is:

1. Traveling decoy apparatus for dog race tracks comprising an overhead track system including spaced cable tracks, one of said tracks having hurdling elevations therein, spaced brackets for supporting the tracks, a carriage operable on either track, an electric motor on the carriage for driving the same, a trolley wire carried by the brackets, a trolley on the carriage riding on the trolley wire, means for adjusting the trolley to ride on said trolley wire when said carriage is on either of said tracks, means suspending a decoy on the carriage, and means for adjusting the suspending means to position the decoy so that it will follow a predetermined path when said carriage is on either of said tracks.

2. Traveling decoy apparatus for dog race tracks comprising an overhead track system including spaced cable tracks, one of said tracks having hurdling elevations therein, spaced brackets for supporting the tracks, a carriage operable on either track, an electric motor on the carriage for driving the same, a trolley wire carried by the brackets, a trolley on the carriage riding on the trolley wire, means for adjusting the trolley to ride on said trolley wire when said carriage is on either of said tracks, and means suspending a decoy on the carriage.

3. A dog race track having, in combination, an overhead track system including a main track and a track branching therefrom, a decoy carriage, power means for driving the carriage, a switch for operating the carriage off the main track onto the branching track, a trap box for receiving the decoy when the carriage is operated onto the branching track, a trap door for the box, means for setting the trap door open, and means operable by the decoy when the decoy moves into the trap box for closing the trap door.

4. Apparatus for dog race tracks including an overhead track system, a carriage thereon, a decoy suspended from the carriage, a starting box for the dogs adapted to be placed on the track, a closure for the box, and trip means engageable by the decoy when placed in the path thereof and operable by movement of the decoy past the box for opening the closure.

5. Apparatus for dog race tracks including an overhead track system, a pair of spaced starting boxes for the dogs adapted to be placed on the race track, said boxes having closures, a decoy, a carriage on the track system adapted to run the decoy between the boxes, and trip means engageable by the decoy when placed in the path thereof and operable by movement of the decoy between the boxes for opening the closures.

6. In a dog race track, the combination with a traveling decoy, of a starting box having a closure and trip means engageable by the decoy when placed in the path thereof and operable by movement of the decoy past the box for opening the closure.

7. The combination with a race track of traveling decoy apparatus for dog races, said apparatus including a track arranged over the race track and comprising a cable and spaced brackets at a side of the race track and supporting the overhead track, a carriage on the overhead track, a motor suspended on the carriage, a trolley wire adjacent the overhead track and supported by the brackets, a trolley on the carriage and riding on the trolley wire for supplying power to the motor, and means depending from the carriage for supporting a decoy adjacent the surface of said race track.

8. The combination with a race track of traveling decoy apparatus for dog races, said apparatus including an overhead track arranged over the race track, a carriage on the overhead track, a motor supported on the carriage, a trolley wire adjacent the overhead track, a trolley on the carriage for supplying power to the motor, and means depending from the carriage for supporting a decoy adjacent the surface of said race track.

9. The combination with a dog race track of an overhead track over the race track, a carriage on the overhead track, a decoy support depending from the carriage to support a decoy just above the surface of the race track, and power means for operating the carriage about the track.

10. The combination with a race track of traveling decoy apparatus for use at dog races, said apparatus including an overhead track over the race track, a carriage on the overhead track, means for suspending a decoy from the carriage to support it just above the track, and one or more hurdles on the race track, said overhead track having elevations therein over the hurdles, said elevations being shaped to cause the decoy to pass over the hurdle.

11. A dog race track having, in combination, a traveling decoy, hurdles, and means comprising a track about the race track on which the decoy travels shaped for causing the decoy to pass over the hurdles to simulate jumping.

12. The combination with a race track of decoy apparatus including an overhead track about the race track, spaced brackets about the inside of the race track to support the overhead track, a carriage on the overhead track, means for operating the carriage about the overhead track, and a support for a decoy depending from said carriage to support the decoy adjacent the surface of the race track.

13. In an animal-coursing apparatus, a lure-conveyer, an animal-cage, a door for said cage, and opening instrumentalities for said door including a part adjacent to the path of and actuatable by said conveyer at a predetermined place in its travel.

14. Apparatus for dog race tracks including an overhead track system, a carriage thereon, a decoy suspended from the carriage, a starting box for the dogs adapted to be placed on the track, a closure for the box, and means operable by movement of the carriage for opening the closure.

CHARLES A. SMITH.